May 24, 1938. H. J. PERAZZOLI 2,118,621
TRACK GRINDER
Filed Feb. 15, 1935 10 Sheets-Sheet 1

Fig. 1.

Inventor:—
Henry J. Perazzoli
by his Attorneys
Synnestvedt & Lechner

May 24, 1938.　　　　H. J. PERAZZOLI　　　　2,118,621
TRACK GRINDER
Filed Feb. 15, 1935　　　10 Sheets-Sheet 3

Inventor:—
Henry J. Perazzoli
by his attorneys

May 24, 1938.   H. J. PERAZZOLI   2,118,621
TRACK GRINDER
Filed Feb. 15, 1935   10 Sheets-Sheet 5

Fig. 6.

Inventor:—
Henry J. Perazzoli
by his Attorneys
Symmestvedt & Lechner

May 24, 1938.  H. J. PERAZZOLI  2,118,621
TRACK GRINDER
Filed Feb. 15, 1935  10 Sheets-Sheet 6

Inventor:
Henry J. Perazzoli
by his Attorneys
Synnestvedt & Lechner

May 24, 1938.   H. J. PERAZZOLI   2,118,621
TRACK GRINDER
Filed Feb. 15, 1935   10 Sheets-Sheet 7

Inventor:—
Henry J. Perazzoli
by his Attorneys
Symestvedt & Lechner

May 24, 1938.   H. J. PERAZZOLI   2,118,621
TRACK GRINDER
Filed Feb. 15, 1935   10 Sheets-Sheet 9

Inventor:
Henry J. Perazzoli
by his attorneys
Synnestvedt & Lechner

May 24, 1938.  H. J. PERAZZOLI  2,118,621
TRACK GRINDER
Filed Feb. 15, 1935  10 Sheets—Sheet 10

Inventor:—
Henry J. Perazzoli
by his Attorneys
Synnestvedt & Lechner

Patented May 24, 1938

2,118,621

UNITED STATES PATENT OFFICE 2,118,621

TRACK GRINDER

Henry J. Perazzoli, Philadelphia, Pa.

Application February 15, 1935, Serial No. 6,662

17 Claims. (Cl. 51—178)

This invention relates to new and useful improvements in railway track grinders and more particularly to devices of that nature capable of removing the overflow metal or burrs that are formed on the stock rails and switch points of railway track switch assemblies.

The principal object of the invention is to provide a railway track grinding machine of the character set forth having novel means whereby the abrasive surface of the grinding element may be adjustably positioned to conform to the angular pitch of the surfaces of the stock rail and switch point to be ground.

Another object of the invention is to provide a railway track grinding machine of the character set forth wherein, in addition to the angular adjustment of the grinding element, the said grinding element may be adjusted transversely and/or vertically of the machine and rail member as well as pivoted relatively with respect thereto, whereby substantially any and all surfaces of the rail elements of a track switch assembly may be ground.

A further object of the invention is to provide a grinding machine of the above character having novel means for securing the grinding element in any one of the positions to which it may be severally adjusted.

Other objects of the invention and the details of construction thereof are set forth more in detail hereinafter and shown in the accompanying drawings, in which.

Figure 14:
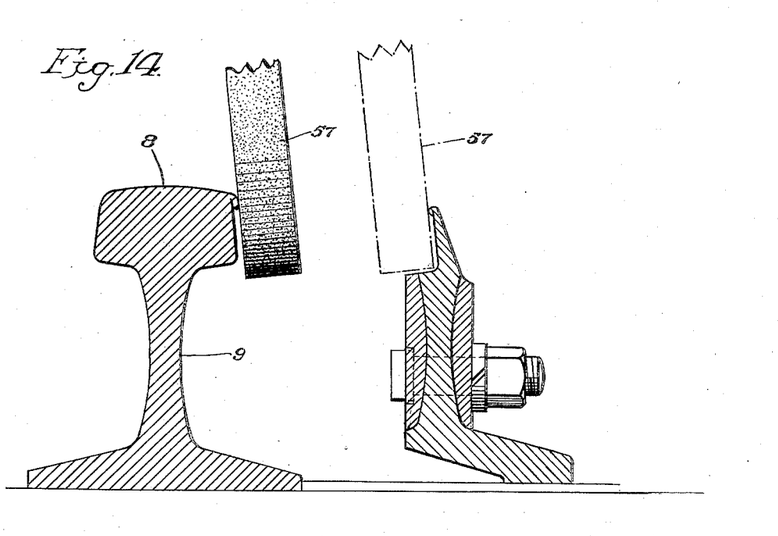
Figures 14 and 15 are enlarged views in section transversely of a track rail showing the grinding element properly positioned with respect to stock rails and switch points of various types of switch assemblies.
Figure 15:
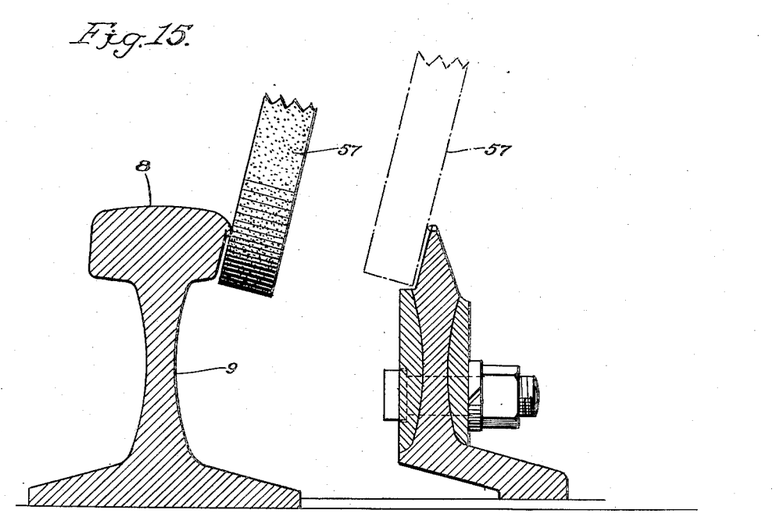

The formation of burrs upon the rail elements of a track switch is caused by the continued passage thereover of the traction wheels of heavy railway trains which results in the metal in the top or traction surface of said rail elements being worked or rolled laterally over the side faces of the stock rails and switch points in the manner shown in Figures 14 and 15 of the drawings. It is well known that if these burrs are not removed periodically from the rails they continue to increase in size to an extent that will preclude the switch from being closed sufficiently to safely permit a railway train to cross over from one track to an adjacent track and the train may be derailed.

The problem of removing burrs from the stock rail and switch point elements of a railway switch has existed since the beginning of railway transportation, and up to the present time it has been the practice to remove this overflow metal or burrs from the switch elements by means of manually chipping away the same, and more recently by means of small hand operated abrasive elements. Obviously, to remove this overflow metal by chipping is extremely unsatisfactory due to the fact that large pieces of the metal are often inadvertently chipped from the traction surface of the rail and produce a rough uneven traction surface for the travel of the wheels of a railway train thereover. Similarly the removal of these burrs by hand operated abrasive elements has been found to be unsatisfactory due to the fact that it is impossible to remove the metal and finish off the side surfaces of stock rails and switch points at equivalent angles so that the switch points may evenly contact the adjacent surface of the stock rail.

Referring now more particularly to the drawings, a machine made in accordance with the present invention comprises a main or supporting frame structure including longitudinal side members 1 and 2 and transverse end members 3 and 4 respectively. Brackets 5, 5 extend downwardly from each of the transverse end frame members 3 and 4 and rollers or traction wheels 6 are mounted therein upon a shaft 7, the wheels 6 being adapted to rest and ride upon the traction surface of the head 8 of the customary track rail 9 as shown in the drawings.

Figure 1:
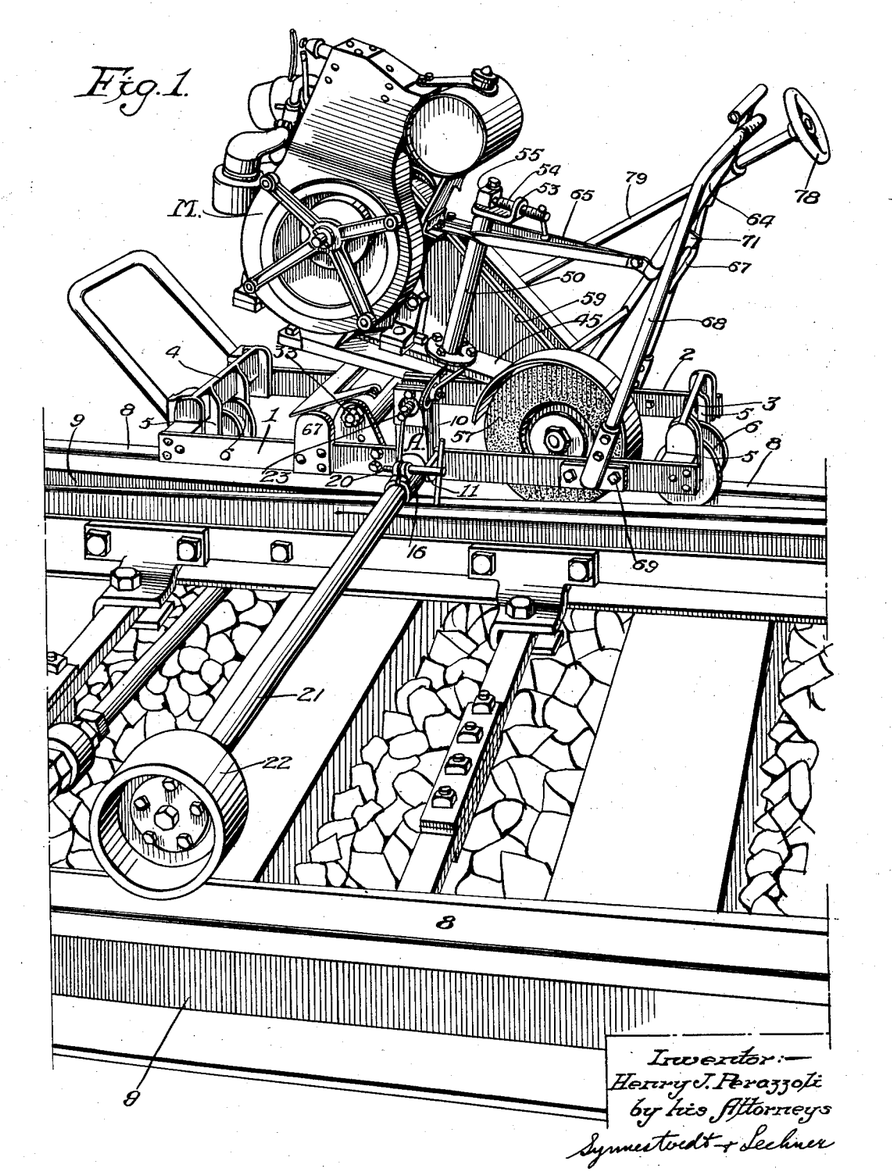
Figure 1 is a view in perspective of a machine made in accordance with the present invention.
Figures 9, 10:
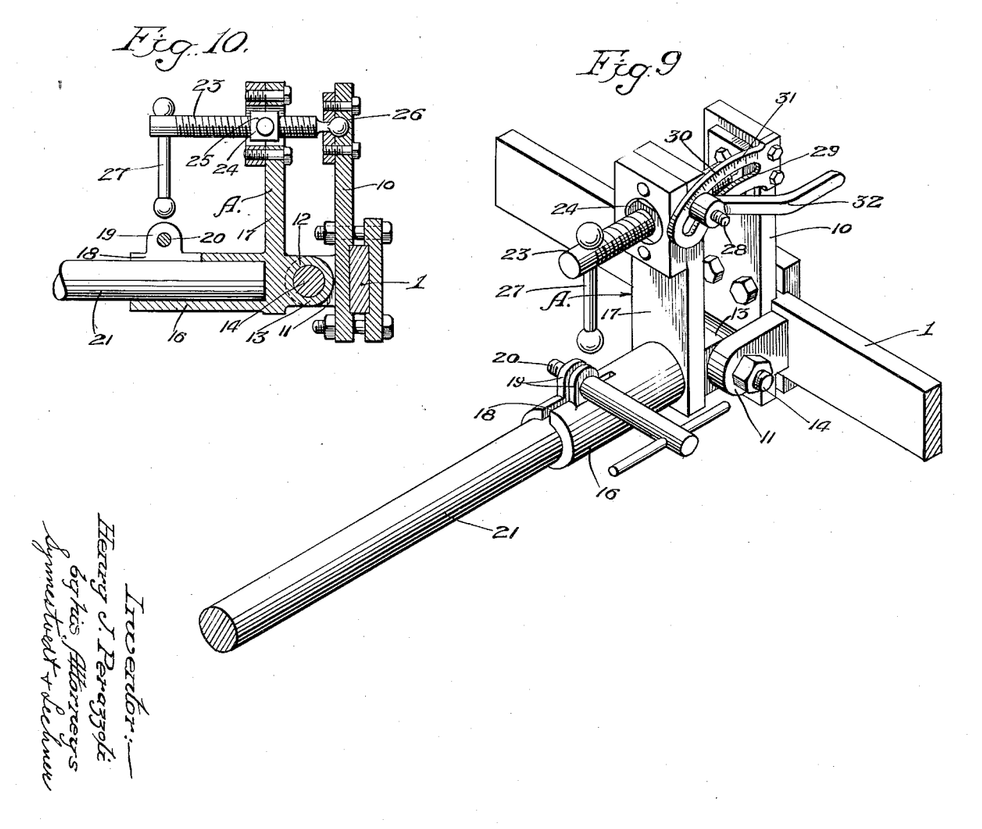
Figure 9 is a detached view in perspective of the means for adjustably regulating the angular pitch of the grinding element.
Figure 10 is a view in section vertically through the disclosure shown in Figure 9.

Referring particularly to Figures 1 and 9 of the drawings, a member or plate 10 is secured in an upright position to the longitudinal side member 1 of the main frame of the machine substantially at its mid-point, and is provided with outwardly projecting spaced parallel lugs 11 having aligned apertures 12 formed therein, the purpose for which will be set forth more in detail hereinafter.

In the present instance the projection 13 of a bracket member designated generally as A, is disposed intermediate the projecting lugs 11 and provided with a transverse bore therein arranged to coincide in alignment with the apertures 12 in the lugs 11. A pivot pin or spindle 14 extends through the apertures 12 in the lugs 11 and the bore in the projection 13 to provide a pivotal connection between the bracket A and the aforementioned member 10 on the main frame structure of the machine.

The bracket A previously referred to includes, in addition to the projection 13, both an integral sleeve portion 16 which extends in an opposite direction from the projection 13 and an intermediate substantially vertical plate portion 17. In the present instance the sleeve 16 is slotted as at 18 and provided with integral upstanding lugs 19 through which is threaded a screw 20. The sleeve 16 is arranged to receive and embrace one end of a rod or shaft 21 which may be secured in said sleeve by clamping the same about the rod by means of the screw 20. A traction wheel or roller 22 is rotatably journalled on the opposite end of the rod 21 and is arranged to rest and ride upon the traction surface of the other rail 9 of the track from that upon which rest the wheels or rollers 6 of the main frame of the machine in the manner shown in Figures 11, 12 and 13 of the drawings.

Referring particularly to Figure 10 of the drawings, an adjusting screw 23 is threaded through a nut 24 secured adjacent an opening at the upper end of the plate portion 17 of the bracket A by means of a retaining member 25 and the inner or machine end of said adjusting screw 23 is connected to the plate member 10 on the main frame by means of a ball and socket arrangement indicated generally by reference numeral 26, the outer or operating end of the adjusting screw 23 being provided with a slidable handle element 27, as shown. A pin 28 projects laterally from one end face of the plate portion 17 of the bracket A and is adapted to slidably engage an arcuate slot 29 formed in a member 30 secured to the corresponding end face of the plate 10.

Figure 11:
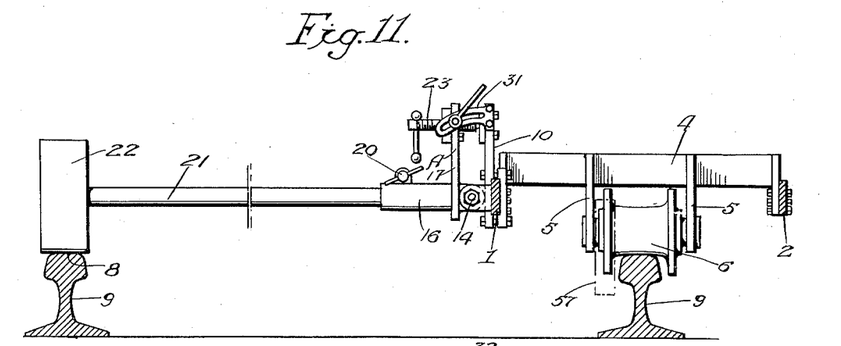
Figures 11, 12 and 13 are diagrammatic views showing the various angular positions to which the grinding element may be adjusted, by means of the mechanism disclosed in Figures 9 and 10, to conform to the pitch of the various surfaces of the track rails.
Figure 12:
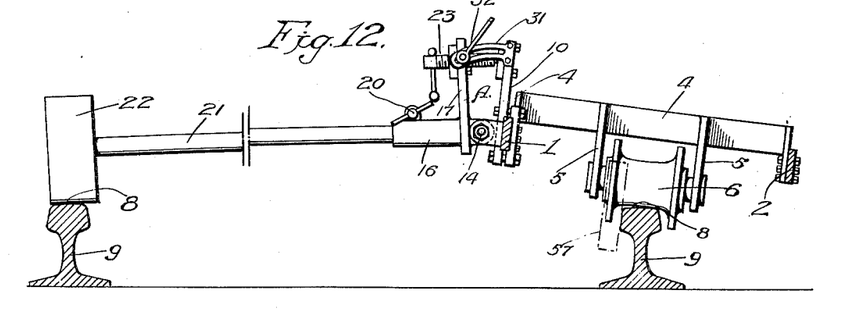
Figure 13:
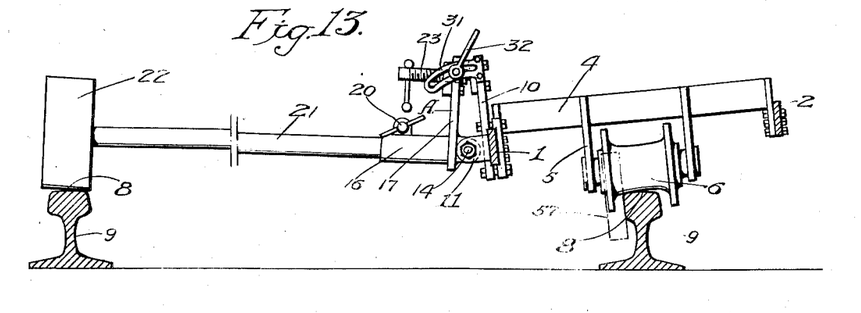

It will be noted from the foregoing description that rotation of the adjusting screw 23 in either direction will cause the bracket A supporting the rod 22 to correspondingly pivot about the pin 14 relative to the plate 10 and the main frame of the machine, thus enabling said frame, and the grinding element associated therewith as hereinafter described, to be disposed at various angular positions relative to the plane surfaces of the track rail as shown in Figures 11 to 13 inclusive. The degree of angular displacement of the machine proper may be accurately determined by appropriately graduating the face of the member 30 to indicate circular degrees of angular displacement as indicated at 31, and a lock nut 32 may be threaded on the pin 28 for the purpose of locking the machine in the desired position of angular displacement.

Figure 5:
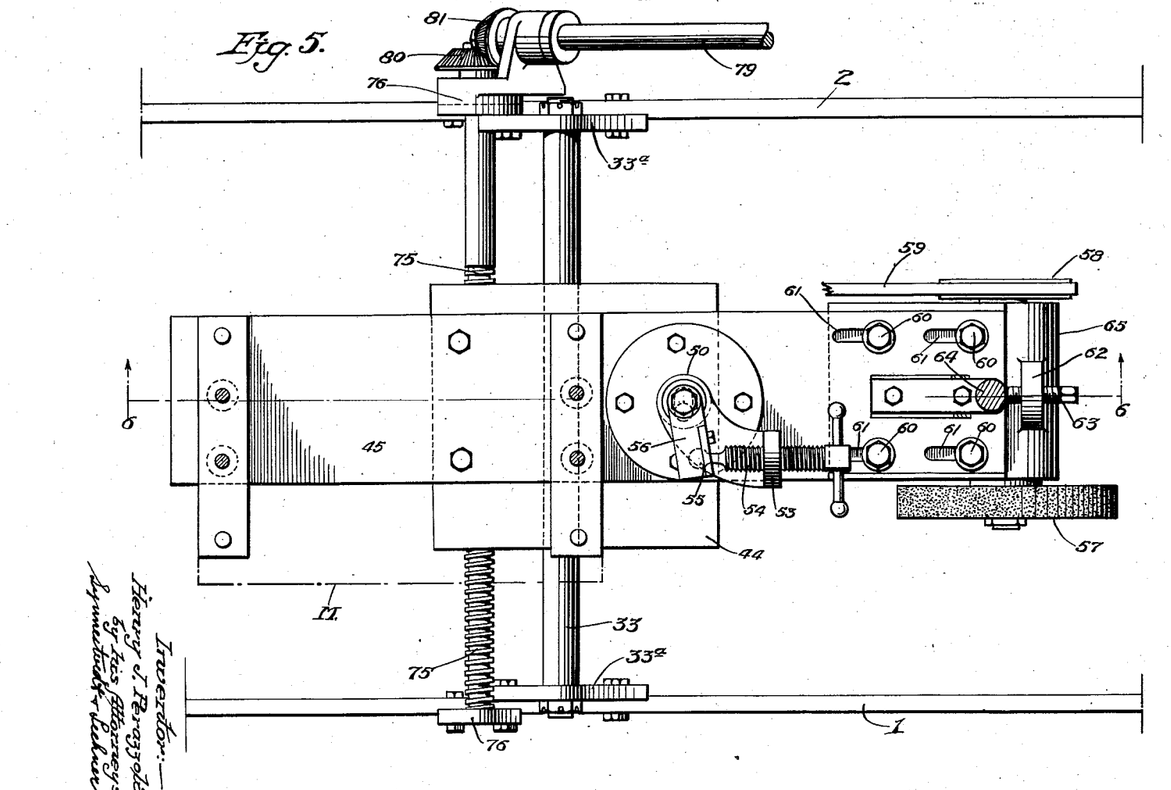
Figure 5 is an enlarged view in plan of the central portion of the grinding machine, the motor and certain other elements such as the ends of the main supporting frame having been omitted.
Figure 6:
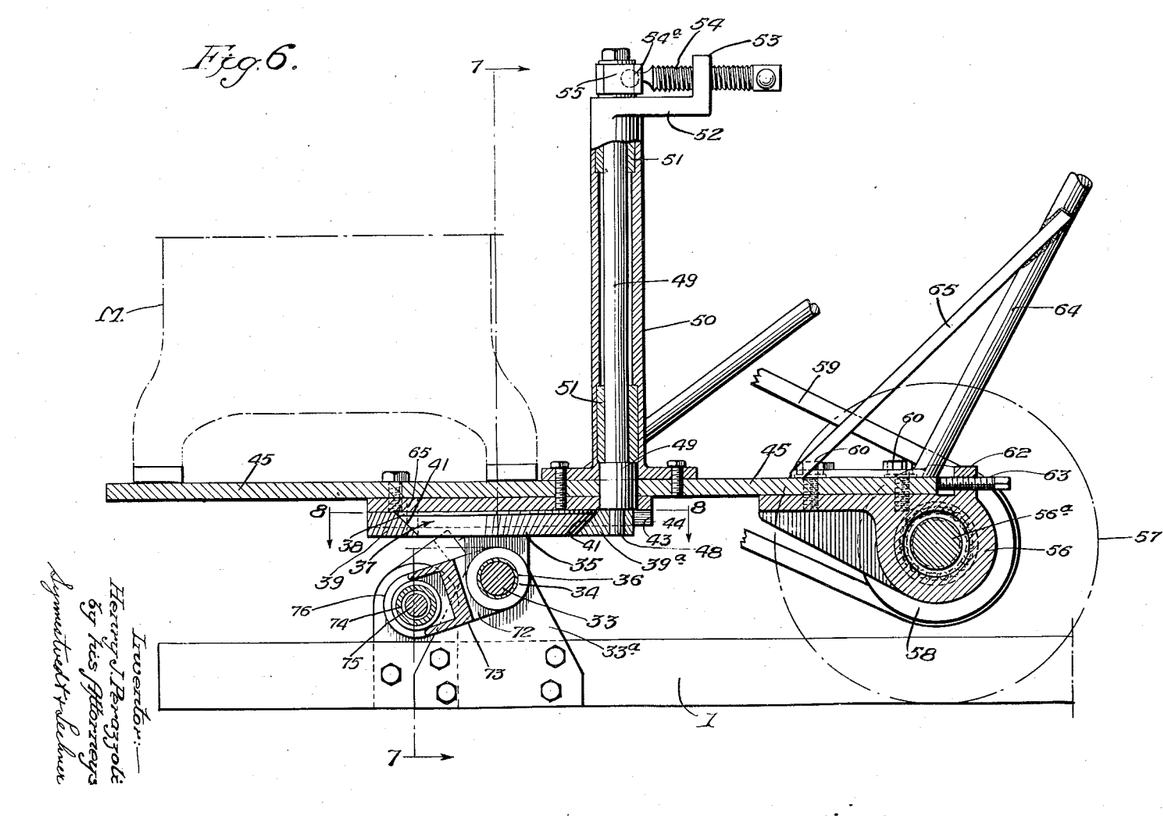
Figure 6 is a view in section on line 6—6, Figure 5.
Figure 7:
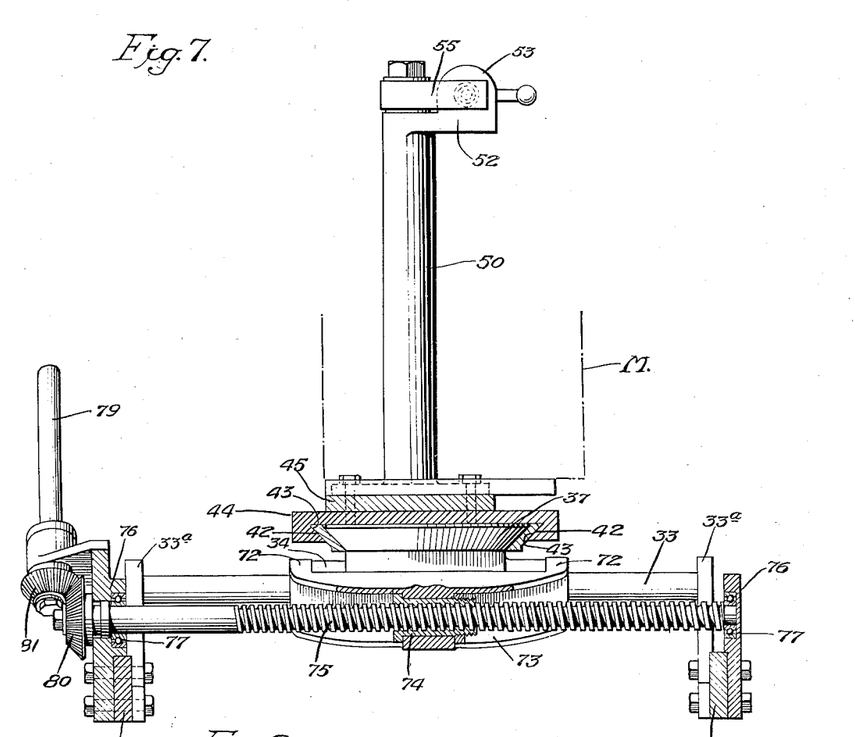
Figure 7 is a view in section on line 7—7, Figure 6.

Referring now particularly to Figures 5, 6 and 7 of the drawings, a shaft 33 is mounted transversely of the main frame by means of brackets 33a, 33a secured to the longitudinal side members 1 and 2 thereof respectively and the sleeve portion 34 of a casting 35 is slidably and rotatably journalled upon the shaft 33 by means of a sleeve bearing 36. The casting 35 also comprises an integral circular plate portion 37, the periphery of which is beveled and diverges upwardly and outwardly as indicated at 38. In the present instance the circular plate portion 37 of the casting 35 is retained in a split ring arrangement composed of plates 39 and 39a (see Figure 8), each of which has a semi-circular cut 40 therein the peripheral edges of which are beveled as indicated at 41 to conform to the peripheral bevel of said circular plate portion 37.

Figure 8:
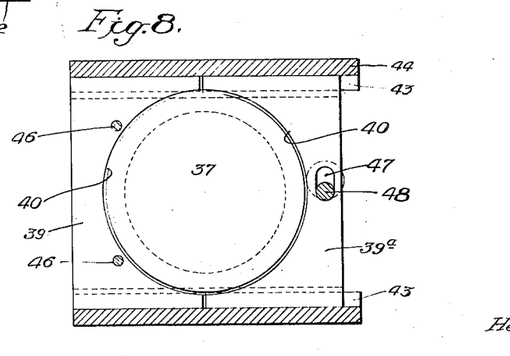
Figure 8 is a view in section on line 8—8, Figure 6.

The plates 39 and 39a are additionally provided with beveled side edges 42 which engage the beveled undercuts 43 in a supporting plate 44 secured to the under side of a platform 45. In the present instance the plate 39 of the split ring assembly is permanently secured relative to the plate 44 by means of bolts 46 as shown in Figure 8, but it is pointed out at this time that the other plate member 39a thereof is arranged for sliding movement in the undercut grooves 43 relative to the plate 44 for the purpose of enabling the same to be moved into and out of engagement with the beveled periphery of the plate portion 37 of the casting 35 to respectively lock the same and prevent relative rotation of the platform 45 and plate 44 with respect to the plate 37 or permit such relative rotation.

The plate 39a is provided with a slot 47 adjacent its outer edge to receive a depending pin 48 eccentrically positioned at the lower end of a shaft 49 journalled in a tubular housing 50 by means of bearings 51. The tubular housing 50 is mounted upon the platform 45 and an arm 52 having an upstanding lug portion 53 projects horizontally from the top thereof. The lug 53 is apertured to receive an adjusting screw 54, the left hand end of which, with respect to Figure 5 is connected by means of a ball and socket arrangement 54a to one end of an arm 55, the other end of which is secured to the aforementioned shaft 49.

From the foregoing description it will be noted that by rotation of the adjusting screw 54 in either direction the shaft 49 will be rotated accordingly and cause the eccentric pin 48 in the slot 47 to shift the plate 39a into or out of engagement with the beveled periphery of plate 37. Obviously therefore, when plate 39a is in engagement with plate 37 relative rotation of the platform 45 is precluded and as said plate 39a is released from engagement with the plate 37 the platform 45 is free to pivot about the same.

Referring now particularly to Figures 5 and 6, a housing 55 is secured to the underside of the platform 45 at the rear or left-hand end thereof and an axle or shaft 56a is rotatably journalled therein. A circular grinding element or abrasive disk 57 is secured on the end of the shaft 56a toward the center of the track and a driving pulley 58 is secured on the other end thereof, said pulley 58, shaft 56a and grinding disk 57 being driven by means of a belt 59 from a motor M mounted on the platform 45. In the present instance the housing 56 is secured to the under side of the platform 45 by means of bolts 60 which engage longitudinal slots 61 to permit the housing 55 to be adjusted longitudinally of said platform 45 and compensate for slack or tension occurring in the belt 59. In order to insure a fine adjustment of the housing 55 longitudinally of the platform 45, a lug 62 is formed integrally with said housing and receives a set screw 63, the inner end of which abuts the adjacent end face of the platform 45 as shown. It will be obvious therefore that when the bolts 60 are loosened, the screw 63 may be adjusted accordingly to predeterminedly adjust the housing 55 longitudinally of the platform 45 before re-tightening said retaining bolts 60.

Figure 2:
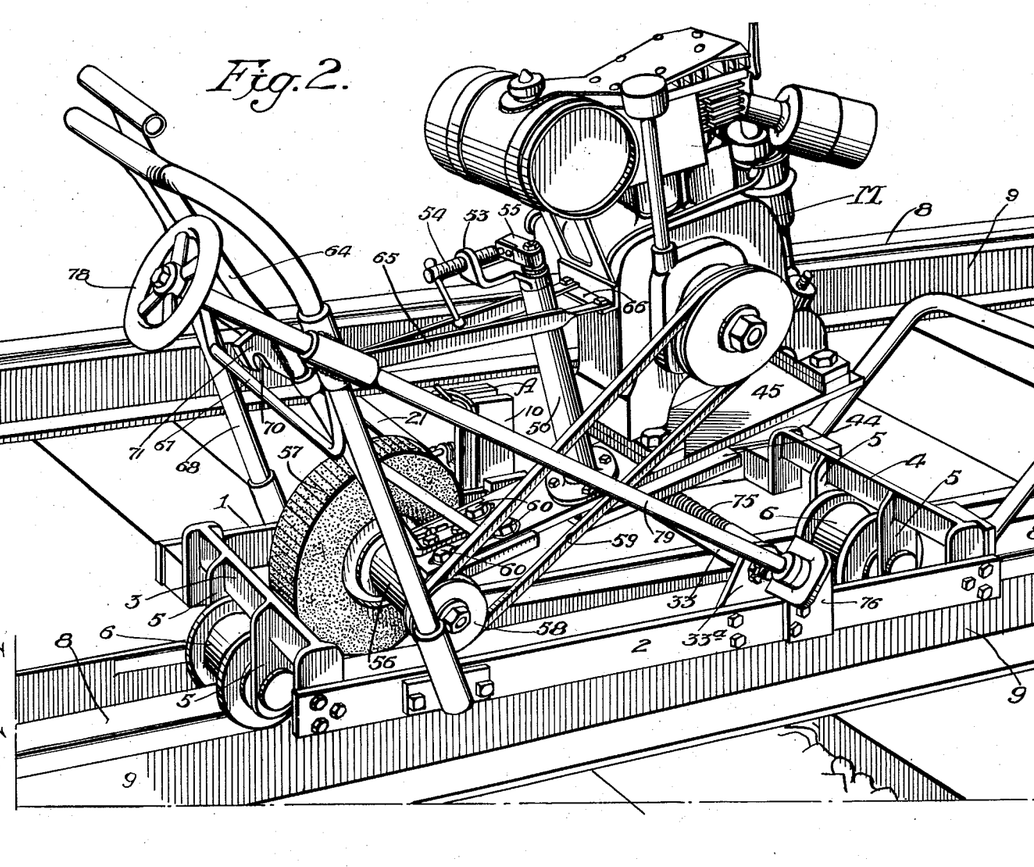
Figure 2 is a view in perspective of the machine from the side opposite to that shown in Figure 1, certain mechanisms having been removed to more clearly show the details of construction thereof.
Figure 3:
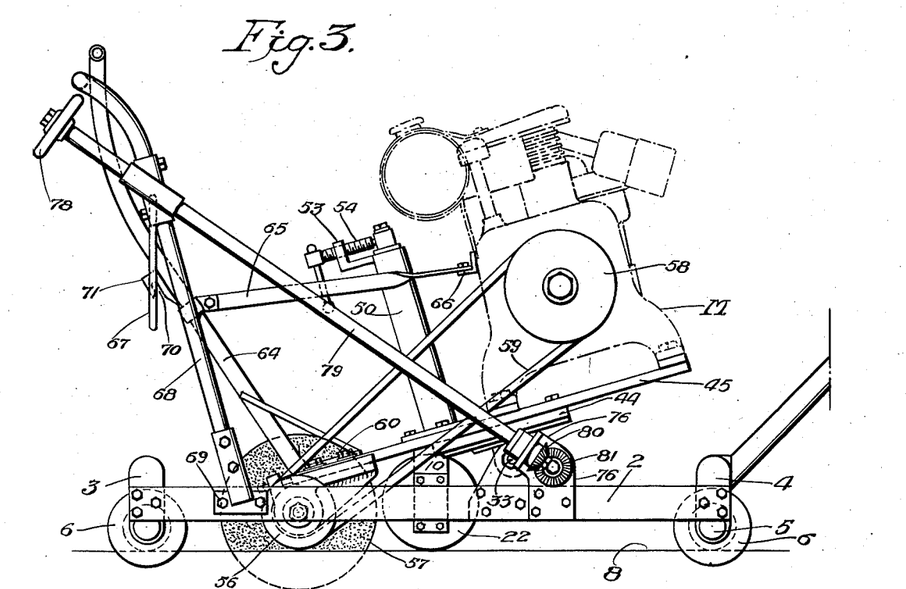
Figure 3 is a view in side elevation showing the grinding machine in operating position relative to the railway track.

For the purpose of pivoting the platform 45 about the shaft 33 to feed the grinding element 57 vertically with respect to the track rails, an operating handle 64 is secured to said platform 45 and supported adjacent its mid-point by means of braces 65 secured to an angle 66 mounted on the motor M as best shown in Figure 2 of the drawings. However, it should be particularly noted at this time that the fit of the sleeve portion 34 of the casting 35 and the bearing 36 respectively on the shaft 33 is sufficiently snug so that enough friction is present to maintain the sleeve 34 in the position to which pivoted, and that the fit of these elements is not so loose that, should the operator inadvertently release the handle 64, the weight of the grinding element 57 would cause the platform 45 to immediately pivot about said shaft 33 and, in effect, permit the grinding disk 57 to drop.

Figure 4:
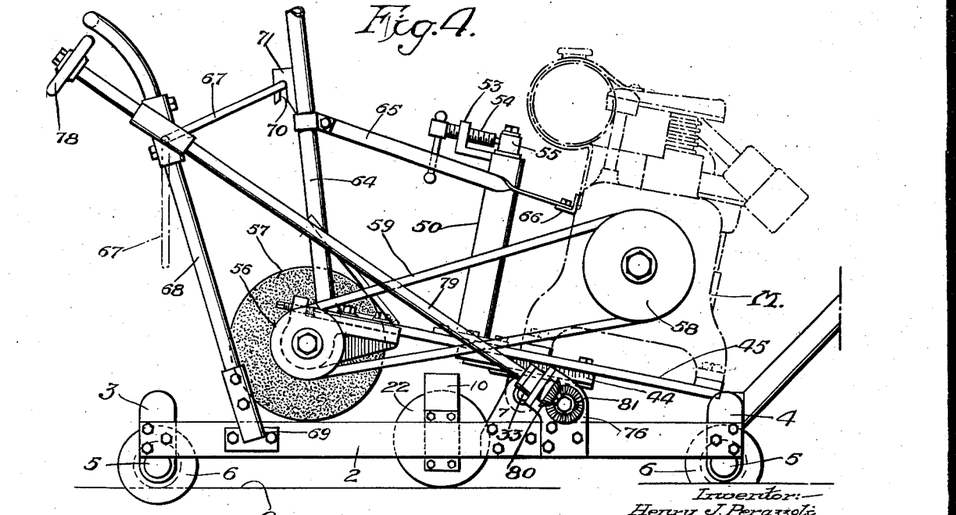
Figure 4 is a view similar to the disclosure in Figure 3 showing the machine in inoperative position.

When moving the entire machine from one grinding location on the track to another it is desirable to pivot the platform 45 about the shaft 33 so that the grinding element 57 is in an elevated position with respect to the rails of the track as shown in Figure 4, and for the purpose of locking said platform 45 in the position shown in the figure of the drawings referred to, a member 67 is pivoted to each of a pair of handles 68 secured at their lower ends to the longitudinal side members 1 and 2 respectively of the main frame structure as indicated at 69 and this member 67 is arranged to engage a slot 70 in an element 71 secured to the aforementioned handle member 64 in the manner shown in Figure 4, it being pointed out that the relative radii through which the handle 68 and the member 67 must rotate about their respective axes will maintain the platform 45 and grinding element in the aforementioned elevated or raised position until such time as the member 67 is released from engagement with member 71.

For the purpose of adjusting the platform 45 transversely of the machine to effect a lateral or sidewise feed of the grinding element 57 with respect to the track rails, the parallel annular portions 72 of a yoke 73 slidably embrace the transverse shaft 33 at each end of the sleeve 34 which as previously stated is slidable as well as rotatable on said shaft. A nut 74 is mounted at the opposite or rear end of the yoke 73 and is engaged by a worm 75 rotatably journalled in brackets 76 by means of ball bearings 77, the said brackets 76 being secured to the longitudinal side members 1 and 2 of the main frame structure. Rotation of the worm 75 is effected in the present instance by means of a hand wheel 78 mounted on a shaft 79 which is connected to the worm 75 by means of beveled gears 80 and 81. From the foregoing construction it will be seen that rotation of the worm 85 in either direction will actuate the yoke 73 transversely of the machine and the annular shaft embracing portions 72 thereof will effect a corresponding traverse of the sleeve 34 and platform 45 associated therewith on the shaft 33.

In operation of the device and with the machine resting upon a railway track substantially in the relation shown in Figure 1 of the drawings, the plate 39a of the split ring arrangement is released from contact with the circular plate 37 by manipulation of the screw 54 to permit the grinding element 57 to be pivoted to a position so that the planes of the side faces thereof are parallel to the axis of the particular rail element to be ground. The platform 45 and the grinding element 57 are then locked against further rotation by re-engaging the plate 39a with the circular plate 37 aforementioned. The lock nut 32 may then be released to permit the machine and grinding element 57 to be pivoted about the pin 14 and positioned at an angle with respect to the normal vertical position shown in Figure 11 to the right or left thereof as illustrated in Figures 12 and 13 respectively, the particular angular adjustment being effected by operation of the screw 23 and facilitated by the graduations on the member 30 so that the planes of the side faces of the grinding element 57 are disposed parallel to the plane of the rail surface to be ground as indicated in the figures of the drawings just referred to as well as in Figures 14 and 15 thereof. When the grinding element has been thus properly located the nut 32 may be tightened to prevent further displacement thereof.

When the relative position of the grinding element 57 with respect to the track rail has been determined in the manner set forth above, and with the motor M driving said grinding disk 57, the platform 45 and the disk 57 are pivoted manually by the operator of the machine about the shaft 33 so that said grinding element 57 is lowered to a position laterally adjacent the surface of the track element to be ground. The grinding element 57 is then fed transversely or laterally into contact with the rail surface by means of the hand wheel 78 and the worm 75. The machine is ordinarily actuated back and forth on the track by the operator thereof in order to grind as great a length along the rail surface as is possible for the particular adjustment, and it will be obvious that as the grinding operation progresses, further transverse or lateral adjustment of the grinding element 57 may be necessary, as well as adjustment of said element vertically with respect to the rail which is accomplished by manually pivoting the platform 45 about shaft 33 by means of the handle 64.

Figure 16:
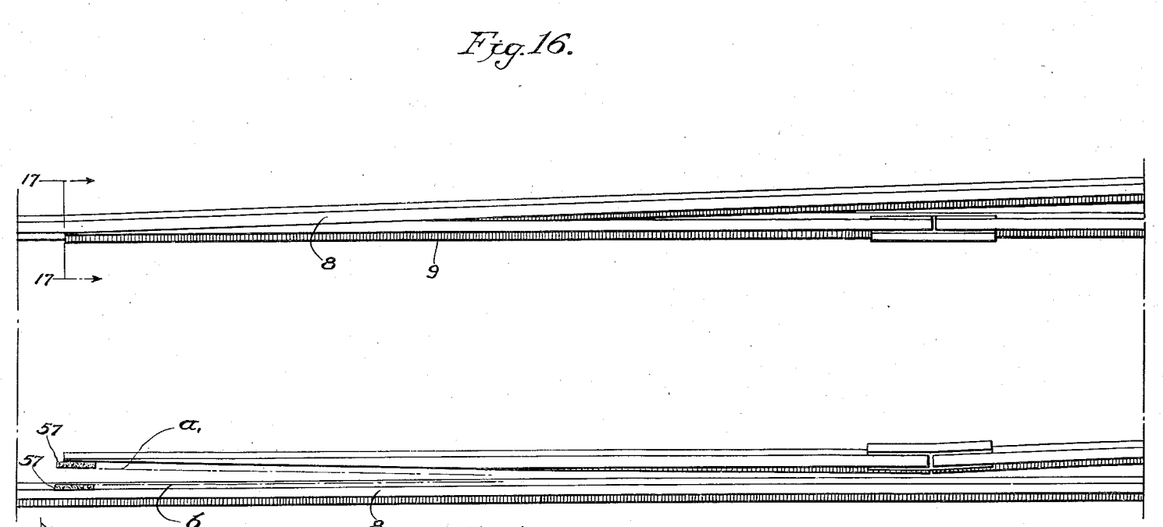
Figure 16 is a fragmentary view in plan of a railway switch assembly showing the grinding element in operative position against the adjacent surfaces of both the stock rail and switch point.
Figure 17:
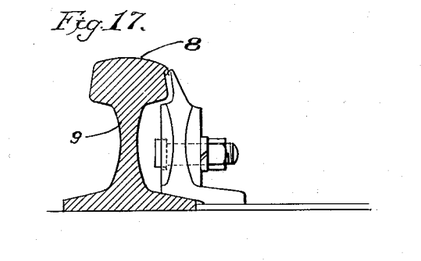
Figure 17 is a view in section on line 17—17, Figure 16, showing the manner in which the metal of the stock rail and switch point overflow to form opposing burrs which prevent proper closing of the switch.

When overflow metal or burrs have been removed from either the stock rail or switch point in the aforementioned manner it will be obvious that the other one of said switch elements may be similarly ground to produce an adjacent abutting surface of the same angular pitch by merely traversing the grinding element 57 from the position shown for instance at *a* in Figure 16 of the drawings to a position indicated at *b* or vice versa, together with possibly some necessary adjustment of the platform 45 and grinding element about the circular plate disk 37 relative to the main frame of the machine to compensate for the change in the angle of direction of the axis of the switch element then to be ground.

In connection with the flexibility of the grinder herein disclosed, it is especially pointed out that the equipment is of particular advantage in the undercutting of a rail head, as shown for example in Figure 15. The advantage in question will be understood more clearly by comparing the showing of Figure 14 with that of Figure 15. Figure 14 illustrates a type of switch extensively used in this country. In numerous instances it is desired to make a change to the type of switch illustrated in Figure 15, and for this purpose it has heretofore been necessary to remove rail 9 from the trackway in order to undercut the side edge thereof. My invention, however, makes possible the undercutting of such a rail and therefore conversion of the switch to the type shown in Figure 15 without removing rail 9 and thus without the consequent traffic delays.

It will be obvious from the foregoing that the present invention provides a grinding machine for railway tracks which is capable of any adjustment that may be necessary in grinding the surfaces of track rails, switch points and like elements, and while the specific construction of one form of the invention has been set forth for the purpose of description it is not intended that the same be precisely limited thereto, but that certain changes and modifications may be made without departing from the spirit of the invention where the same lie within the scope of the annexed claims.

I claim:

1. In a railway track grinding machine, the combination with a frame having traction wheels arranged to rest upon one rail of the track, a grinding wheel carried by said frame and having its axis of rotation normally perpendicular to the axis of the rail, an arm pivotally connected to the frame and extending laterally therefrom for supporting the machine on the rail, and means operative at will to predeterminedly adjust the angle of pivot of the frame with respect to the arm and track so that a side face of the grinding wheel resides in a plane parallel to the plane of the rail surface to be ground.

2. In a railway track grinding machine, the combination with a frame having traction wheels arranged to rest upon one rail of the track, a grinding wheel carried by said frame and having its axis of rotation normally perpendicular to the axis of said rail, an arm extending laterally from the frame of the machine in the direction of the other rail of the track, a roller mounted on said arm and arranged to rest upon said other rail to support the machine in an upright position on the track and a pivotal connection between the arm and the frame enabling angular displacement of the latter and the grinding wheel to position the side face of the latter in a plane parallel to the angular pitch of the surface to be ground.

3. In a railway track grinding machine, the combination with a frame having traction wheels arranged to rest upon one rail of the track, of a shaft extending transversely of said frame, a sleeve embracing said shaft, a platform, a grinding wheel carried thereby and having its axis of rotation normally perpendicular to the axis of the rail, said platform being pivotally mounted on said sleeve so that the same may be rotated relatively to the sleeve and the frame to position a side face of the grinding wheel in a plane parallel to the axis of a rail to be ground, an arm extending laterally from the frame in the direction of the other rail of the track, a roller mounted thereon and arranged to rest upon said other rail to support the machine in a substantially upright position on the track, and a pivotal connection between the arm and the frame for angular displacement of the machine and grinding wheel laterally with respect to the axis of said rail to position a side face of the grinding wheel in a plane parallel to the rail surface to be ground.

4. In a railway track grinder, the combination with a frame having traction wheels arranged to rest upon one rail of the track, of a shaft extending transversely of said frame, a platform slidably and pivotally mounted on said shaft, a grinding wheel carried by said platform and having its axis of rotation normally perpendicular to the axis of the rail, means operable at will to actuate the platform longitudinally on the shaft transversely of the frame to feed the grinding wheel laterally with respect to the rail, an arm pivotally connected to said frame and extending in the direction of the other rail of the track, a roller mounted on the other end of said arm and adapted to rest upon said other track rail to support the grinding machine in a substantially upright position on said track, and means operative at will to predeterminedly adjust the angle of pivot of the frame with respect to the arm and track to position the side faces of the grinding element in planes parallel to the plane of the rail surface to be ground.

5. In a railway track grinding machine, the combination with a frame arranged to rest upon one rail of the track, of a shaft extending transversely of said frame, a sleeve slidably and rotatably journalled on said shaft, a platform rotatably mounted on said sleeve, a grinding wheel carried by said platform and having its axis of rotation normally perpendicular to the axis of the rail, means operable at will to lock the platform against relative rotation thereof with respect to the said sleeve, means operable at will to adjust the sleeve, platform, and grinding wheel transversely of the shaft and the track rail, an arm extending laterally from the frame of the machine in the direction of the other rail of the track, a roller mounted on said arm and arranged to rest upon the said other track rail to support the machine in an upright position on the track, and a pivotal connection between the arm and the frame enabling angular displacement of said frame with respect to the track to position the grinding wheel parallel to the rail surface to be ground.

6. In a railway track grinding machine, the combination with a frame having traction wheels arranged to rest upon one rail of the track, of a shaft extending transversely of said frame, a sleeve embracing said shaft, a platform, a grinding wheel carried thereby and having its axis of rotation normally perpendicular to the axis of the rail, said platform being pivotally mounted on said sleeve so that the same may be rotated relatively to the sleeve and the frame to place a side face of the grinding wheel in a plane parallel to the axis of a rail to be ground, means operable to lock the platform and grinding wheel in the position to which the same is rotated, an arm pivotally connected to said frame and extending in the direction of the other rail of the track, a roller mounted on the other end of said arm and arranged to rest upon said other rail to support the machine in an upright position on the track, and means operable at will to predeterminedly adjust the angular displacement of the frame with respect to the arm and track to position a side face of the grinding wheel in a plane parallel to the pitch of the surface of such rail to be ground.

7. In a railway track grinding machine, the combination with a frame having traction wheels arranged to rest upon one rail of the track, of a shaft extending transversely of said frame, a sleeve embracing said shaft, a platform, a grinding wheel carried thereby and having its axis of rotation normally perpendicular to the axis of the rail, said platform being pivotally mounted on said sleeve so that the same may be rotated relatively to the sleeve and the frame to place a side face of the grinding wheel in a plane parallel to the axis of a rail to be ground, means operable to traverse the sleeve on the shaft and feed the grinding wheel laterally with respect to such rail, an arm extending laterally from the frame of the machine in the direction of the other rail of the track, a roller mounted on said arm and arranged to rest upon said other rail to support the machine in an upright position on the track, and a pivotal connection between the arm and the frame to permit angular displacement of the latter with respect to the axis of the track rail so that a side face of the grinding wheel resides in a plane parallel to the angular pitch of the rail surface to be ground.

8. Apparatus for grinding side surfaces of rails of a trackway, especially rail elements of switches and the like, including a grinding element adapted to move in a generally vertical plane for grinding purposes, a support for said element adapted to rest on and be positioned by a trackway, means mounting said element with a side face thereof in position to grind a side face of a rail, means for tilting the plane of movement of the grinding element from the vertical transversely of the trackway toward either side thereof, adjustable means for bodily shifting said element to different positions transversely of the trackway, said last means being operative while maintaining a given adjustment of the first means, and means for angularly adjusting the plane of movement of the grinding element about a generally upright axis.

9. A railway track grinding machine having supporting means adapted to engage a rail of the trackway and including a grinding wheel mounted in position to present a side face thereof to a side face of a rail, means mounting the wheel on the supporting means and providing for movement of the grinding wheel with respect to the supporting means generally transverse the axis of the rail toward and away from the face to be ground, and means providing for movement of the grinding wheel with respect to the supporting means about a generally upright axis.

10. A railway track grinding machine having supporting means adapted to engage a rail of the trackway and including a grinding wheel mounted in position to present a side face thereof to a side face of a rail, means mounting the wheel on the supporting means and providing for movement of the grinding wheel with respect to the supporting means generally transverse the axis of the rail toward and away from the face to be ground, means providing for movement of the grinding wheel about a substantially horizontal axis generally paralleling the axis of the rail to be ground, and means providing for movement of the grinding wheel about a generally upright axis.

11. A railway track grinding machine having supporting means adapted to engage a rail of the trackway and including a grinding wheel mounted in position to present a side face thereof to a side face of a rail, means providing for movement of the grinding wheel generally transverse the axis of the rail toward and away from the face to be ground, means providing for movement of the grinding wheel about a generally upright axis, and means for locking the grinding wheel in an adjusted position about said generally upright axis, the grinding wheel being adjustable toward and away from the side face of the rail to be ground by said means first mentioned with the wheel locked by said locking means.

12. A railway track grinding machine having supporting means adapted to engage a rail of the trackway and including a grinding wheel carried on said supporting means in position to present a side face thereof to a side face of a rail, means providing for movement of the grinding wheel generally transverse the axis of the rail toward and away from the face to be ground, means providing for movement of the grinding wheel about a generally upright axis, and means providing for generally vertical movement of the grinding wheel to an extent sufficient to present a side face of the grinding wheel to a side face of a rail and sufficient to clear a rail.

13. A railway track grinding machine having supporting means adapted to engage a rail of the trackway, a platform carried by the supporting means, a grinding wheel and a driving motor therefor carried by the platform, and means for adjusting the position of the platform and therefore of the grinding wheel transversely of the axis of a rail to be ground, the grinding wheel being carried in position to present a side face thereof to a side face of a rail to be ground, and means for adjusting the position of the grinding wheel about a generally upright axis.

14. A railway track grinding machine having supporting elements adapted to engage a rail of the trackway, a platform carried by the supporting elements, a grinding wheel and a driving motor therefor carried by the platform, means for adjusting the position of the platform and therefore of the grinding wheel transversely of the axis of a rail to be ground, the grinding wheel being carried in position to present a side face thereof to a side face of a rail to be ground, means for adjusting the position of the grinding wheel about a generally upright axis, and means for angularly adjusting the position of the supporting elements about an axis generally paralleling the rail engaged thereby, whereby to move the grinding wheel about a generally horizontal axis substantially paralleling the rail to be ground.

15. A railway track grinding machine having supporting means adapted to engage a rail of the trackway and including a grinding wheel mounted in position to present a side face thereof to a side face of a rail to be ground, means mounting the wheel on the supporting means and providing for movement thereof about a substantially horizontal axis generally paralleling the axis of the rail to be ground, and means providing for movement of the grinding wheel about a generally upright axis.

16. A railway track grinding machine including a frame having a plurality of wheels adapted to engage and rest on a plurality of rails, the frame being jointed intermediate the rails on an axis generally paralleling the rails to provide freedom for angular movement of frame parts at opposite sides of the joint, a grinding wheel carried by one of said frame parts and being rotatable in a plane generally paralleling the axis of a rail to be ground, and adjustable means for moving the grinding wheel generally vertically throughout a range sufficient to bring a side face of the grinding wheel into contact with a side face of a rail to be ground and sufficient to permit the grinding wheel to pass over the top of a rail.

17. A railway track grinding machine including a frame having a plurality of wheels adapted to engage and rest on a plurality of rails, the frame being jointed intermediate the rails on an axis generally paralleling the rails to provide freedom for angular movement of frame parts at opposite sides of the joint, a grinding wheel carried by one of said frame parts and being rotatable in a plane generally paralleling the axis of a rail to be ground, adjustable means for moving the grinding wheel generally vertically throughout a range sufficient to bring a side face of the grinding wheel into contact with a side face of a rail to be ground and sufficient to permit the grinding wheel to pass over the top of a rail, and means providing for feed of the grinding wheel in a direction generally transverse the rail to be ground.

HENRY J. PERAZZOLI.